Figure 1:
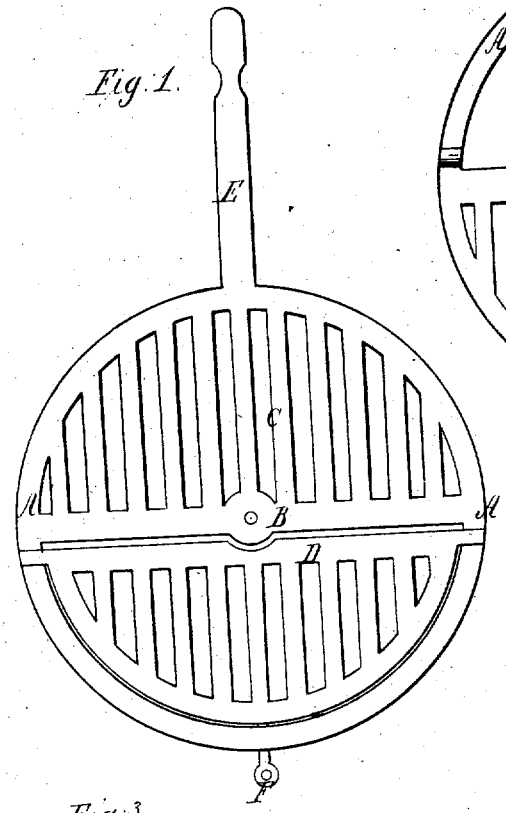
Figure 2:
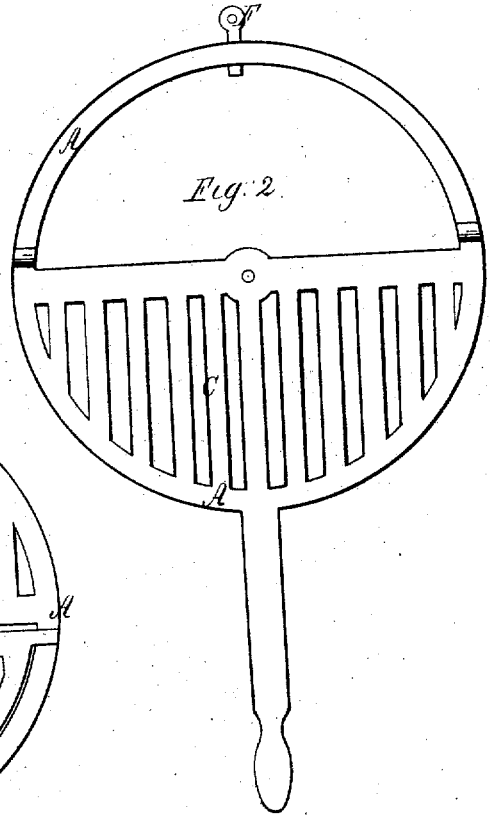
Figure 3:
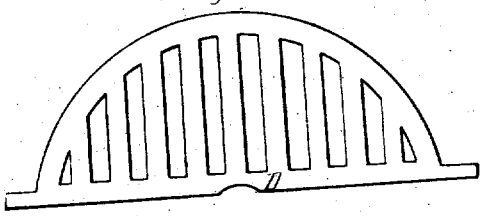
Figure 4:
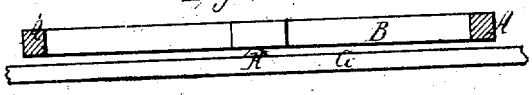
Figure 5:
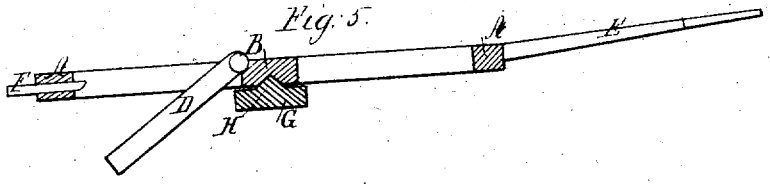

7947X

J. I. Hess

Grate.

Patented Jan. 9. 1834.

7947X John I. Hess
Letters Patent 7947X

The Schedule referred to in these Letters Patent, and making part of the same, containing a description in the words of the said John I. Hess himself of his improvement in the seive or riddle called a Rotator for separating ashes from cinders or coal.

---

It consists of a circle of iron with a handle & is divided in the middle by a bar having ribs or bars running transversely from it to the arch of the circle & made perfectly firm & fast. In the center & upon the bar of the chord dividing the circle is a circular knob grooved on its under side with a smooth pyramidical cavity which circumvolutes upon an abrupt cone attached to another bar on which the rotator rests or vibrates, when separating the coal & cinders of the grates from the ashes.
Upon this rotary movement I found my right of claim being new in the invention & having never heretofore been applied or used for such purposes in stoves. The rest are upon the old principles.
Within the space of the other half of the circle, between the chord & the arch moves a smaller segment of a circle, having gudgeons at the extremities of its chord, which play into grooves on the surface of the circle of the rotator & is supported in an horizontal position by an iron pin which slips thro a channel or groove cut underneath the handle of the rotator. When the pin is withdrawn the lesser segment drops perpendicularly downward, & instantly empties the grate of its contents.

Witnesses
Saml. Gilbert
B. B. Steville

John I. Hess

Drawing 252 words

Ex. [illegible]